United States Patent [19]
Tallman

[11] Patent Number: 4,792,895
[45] Date of Patent: Dec. 20, 1988

[54] INSTRUCTION PROCESSING IN HIGHER LEVEL VIRTUAL MACHINES BY A REAL MACHINE

[75] Inventor: Peter H. Tallman, Wappingers Falls, N.Y.

[73] Assignee: International Business Machines Corp., Armonk, N.Y.

[21] Appl. No.: 82,966

[22] Filed: Aug. 4, 1987

Related U.S. Application Data

[63] Continuation of Ser. No. 635,388, Jul. 30, 1984, abandoned.

[51] Int. Cl.$^4$ ................................................ G06F 9/44
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,253,145 | 2/1981 | Goldberg | 364/200 |
| 4,346,436 | 8/1982 | Wise | 364/200 |
| 4,376,297 | 3/1983 | Anderson et al. | 364/200 |
| 4,400,769 | 8/1983 | Kaneda et al. | 364/200 |
| 4,456,954 | 6/1984 | Bullions, III et al. | 364/200 |
| 4,494,189 | 1/1985 | Bean et al. | 364/200 |

OTHER PUBLICATIONS

Gum, "System/370 Extended Architecture: Facilities for Virtual Machines", vol. 27, No. 6, Nov. 1983.

*Primary Examiner*—Gareth D. Shaw
*Assistant Examiner*—Christina M. Eakman
*Attorney, Agent, or Firm*—Joseph A. Biela

[57] ABSTRACT

A method is disclosed for processing instructions in higher level virtual machines by a 370-XA mode real machine. The real machine and a low level virtual machine each execute a version of the real machine's system control program. The low level virtual machine issues a privileged (SIE) instruction which is simulated by the real machine indicating that instructions in a higher level virtual machine are to be processed. A shadow state description is created and used by the privileged instruction for describing the higher level virtual machine directly to the real machine. Shadow address translation tables are also created in the case when the higher level virtual machine is a pageable machine so that interpretive execution hardware, invoked by the privileged instruction, can translate through the higher level virtual machine translation tables followed by translation through the shadow translation tables. The privileged instruction will, in certain cases, cause the interpretive execution hardware to intercept and interpret storage key manipulating instructions in order to update the real and higher level virtual machine status bits in RCP bytes in response to bit settings in storage key bytes associated with pages which have been accessed or changed. As a result, address translation can occur from a higher level virtual machine absolute storage to the real machine absolute storage.

6 Claims, 7 Drawing Sheets

INSTRUCTION PROCESSING IN HIGHER LEVEL VIRTUAL MACHINES BY A REAL MACHINE

This is a continuation of application Ser. No. 635,388, filed July 30, 1984, now abandoned.

BACKGROUND OF THE INVENTION

1. Field of the Invention

The present invention relates to computer systems and more particularly to virtual machine systems which provide for instruction processing in multiple levels of virtual machines.

2. Prior Art

The architecture of the IBM System/370-XA (370-XA mode) is described in publication SA22-7095. The IBM System/370-XA has evolved from the IBM System/370 Architecture (370 mode) which is described in publication GA22-7000. The System/370-XA can be implemented as the real (host) machine in a virtual machine system as well as a virtual machine (guest) which is supported by the host. The System/370 can also be implemented as a guest of the host machine.

For a host machine to perform the functions of a low level (level 2) guest, a start interpretive execution (SIE) instruction is implemented. (The SIE instruction is described in U.S. Pat. No. 4,456,954, which issued on June 26, 1984 and is assigned to the assignee of this application, and is incorporated herein by reference.) The SIE instruction invokes interpretive execution hardware in the host in order for the host to enter the interpretive execution mode for the purpose of executing a program in a level 2 guest. SIE provides for all of the mapping of any paging done by the level 2 virtual machine. In particular, the SIE instruction provides for the mapping of absolute addresses of the level 2 guest to any continuous portion of the virtual address space of the host or the first portion of the absolute address space of the host. Since System/370-XA is used as the host machine, each pageable level 2 guest maps to a separate host virtual address space.

However, a host machine cannot perform the functions of a higher level (level 3) guest simply by executing a SIE instruction. The reason is that the interpretive execution hardware is capable of providing only two levels of address translation, i.e. within a level 2 guest and from a level 2 guest to the host (at level 1). When a level 3 guest is included in the virtual machine computing system, interpretive execution hardware cannot translate through level 3 guest translation tables.

It is therefore an object of the present invention to provide address translation through three levels of guests.

It is another object of the invention to utilize interpretive execution hardware to translate through three levels of guests.

It is a further object of this invention to reduce the number of levels of address translations by one when three levels of guests are implemented.

It is also an object of this invention to describe the level 3 guest directly to the host.

It is a further object of this invention to describe the storage mode of the level 3 guest directly to the host bypassing the level 2 guest.

Reference and change preservation (RCP) is the SIE facility that manages the reference and change bits of a storage key byte. The SIE instruction, through the interpretive execution hardware, maintains storage key bytes in respose to storage key manipulating instructions issued by a level 2 guest. SIE causes the interpretive execution hardware to simulate these storage key manipulating instructions thereby using the RCP facility in the simulation.

In the case of a preferred level 2 guest, interpretive execution hardware provides for the guest to manipulate the acutal storage key bytes. The RCP facility is not used since the storage key bytes are owned by the level 2 preferred guest, i.e. the page frames are used solely by the preferred level 2 guest and are not paged by the host.

In the case of a pageable level 2 guest, interpretive execution hardware provides for the guest or host to manipulate the actal storage key bytes as host or guest instructions are executed. However, the reference and change bits for both the host and the guest are "copied" from a storage key byte to an RCP byte for the purpose of updating a table of RCP bytes. The RCP bytes are only updated when storage key manipulating instructions are executed. For example, when the level 2 guest executes an appropriate storage key manipulating instruction, the interpretive execution hardware updates the host and guest status bits in the RCP bytes. In this way, host and guest status is retained in the host and guest portions of an RCP byte when storage accesses or changes occur in the page associated with the storage key byte.

In the case of a (pageable) level 3 guest, a page frame of host real storage may be the object of a translation for level 3 guest purposes and host purposes simultaneously. However, the manipulation (setting and resetting) of the reference and change bits in the real storage key by the level 3 guest could leave the bits in an incorrect state with respect to the management of host real storage. Also, changes to the storage key bits by the host could result in the incorrect indication of guest real storage.

In accordance with the above, it is an object of this invention to retain page change and reference indicators when a level 3 guest is implemented in a virtual machine system having a host and a level 2 guest.

It is another object of this invention to retain page change and reference indicators that are separately applicable to a level 3 guest and to the host when pageable storage mode is specified.

The following publications contain the background information for the invention disclosed and claimed herein and are incorporated herein by reference.

1. IBM publication SA22-7095 (file number S370-01) entitled "IBM System/370 Extended Architecture—Interpretive Execution".

2. Gum, P. H., "System/370 Extended Architecture: Facilities for Virtual Machines", IBM Journal of Research and Development, Vol. 27, No. 6, November 1983.

SUMMARY OF THE INVENTION

A computer system having a real machine and multiple levels of virtual machines is disclosed and claimed in which the real machine and a low level machine use the same architecture. The real machine processes instructions in a higher level virtual machine by intercepting a privileged instruction in the low level virtual machine and creating a shadow state description which is used by the privileged instruction for processing instructions in the higher level virtual machine.

DESCRIPTION OF THE PREFERRED EMBODIMENT

Figure 1:
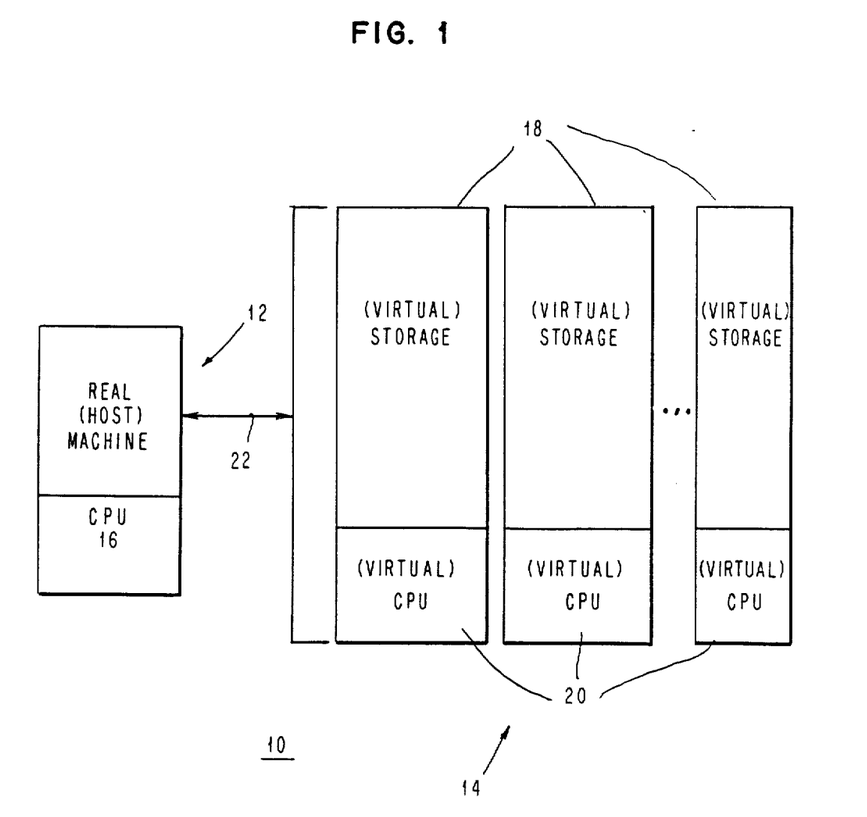
FIG. 1 is a block diagram of the structure of the virtual machine system of the invention.

FIG. 1 shows the structure of computer system 10 referred to as a virtual machine (VM) system. The VM system includes real (host) machine 12 and a plurality of virtual machines (guests) 14 supported by the real machine. The real machine includes central processing unit (CPU) 16 that executes a system control program (SCP), referred to as the host program or virtual machine monitor (VMM), which manages real machine resources (CPU, memory) and provides services to the guests via line 22. An example of the virtual machine monitor is the VM/XA control program (program number 5664-169). In particular, the host program controls the resources of the real machine while providing each user with a virtual machine environment that includes virtual machine resources such as (virtual) storage 18, i.e. virtual machine address space, and a (virtual) CPU 20. This means that each guest has an architecture that is identified and described by the host. From the user's perspective, each guest appears to be a complete computer system having an assigned set of resources (described for each guest). One characteristic of the VM system is that each virtual machine environment is substantially the same as a real machine environment such that an operating system and applications program (guest programs) running in each virtual machine cannot detect the difference, though the environments are in fact different. This means that the actual operating environment is transparent to each guest program. In order for the actual operating environment to be transparent to a guest program, the same changes must occur, with respect to the resources to which the guest program has access, in one environment as would occur if the guest program were in any other environment.

In the embodiment of this invention, a method of operation is provided in which the host machine, while in an interpretive-execution mode, performs the functions of a guest (an interpreted machine). In other words, the real machine supports the virtual machine environment by executing (processing) the instructions of programs in a guest while the real machine is in the interpretive execution mode. The interpretive excecution of one of several guest machines begins when the host executes a start interpretive execution (SIE) instruction. The SIE instruction initiates interpretive execution hardware to provide for the host machine to enter the interpretive execution mode and to commence execution of a guest program. The operand of the SIE instruction is referred to as the state description. The state description, which is located in real storage, includes parameters that describe the logical condition of the guest whose instructions are to be executed (interpreted). In particular, fields in the state description specify the architecture of the guest, the contents of some of the program-addressable guest registers, the addresses of related control tables, the initial state of the guest CPU, and information about other aspects of the operation to include how host storage is to be used to represent guest main storage (guest storage mode).

For example, the host machine (at level zero) executes a version of the host machine's system control program VM/XA (a first level program). A guest executes a copy of the host version of VM/XA (a second level program) which is initiated by an invocation of SIE by the host. The second level guest, in turn, uses SIE to initiate another (different) guest program (a third level program). In this example, the host and second level guest use IBM System/370 extended architecture and the third level guest uses IBM System/370 architecture. Use of multiple levels of virtual machines (guests) aid in the development, checkout and use of new or changed programs, i.e. VM/XA, in a virtual machine environment without requiring a separate (dedicated) physical machine. For example, modified versions of VM/XA can be supported by interpretive execution by a host running a prior version of VM/XA. Since a second level guest is capable of running VM/XA, it is possible for a third level guest to run VM/XA which, in turn, makes it possible for more (higher) levels of guest to run VM/XA.

STATE DESCRIPTION FIELD SPECIFICATIONS

Figure 2A:
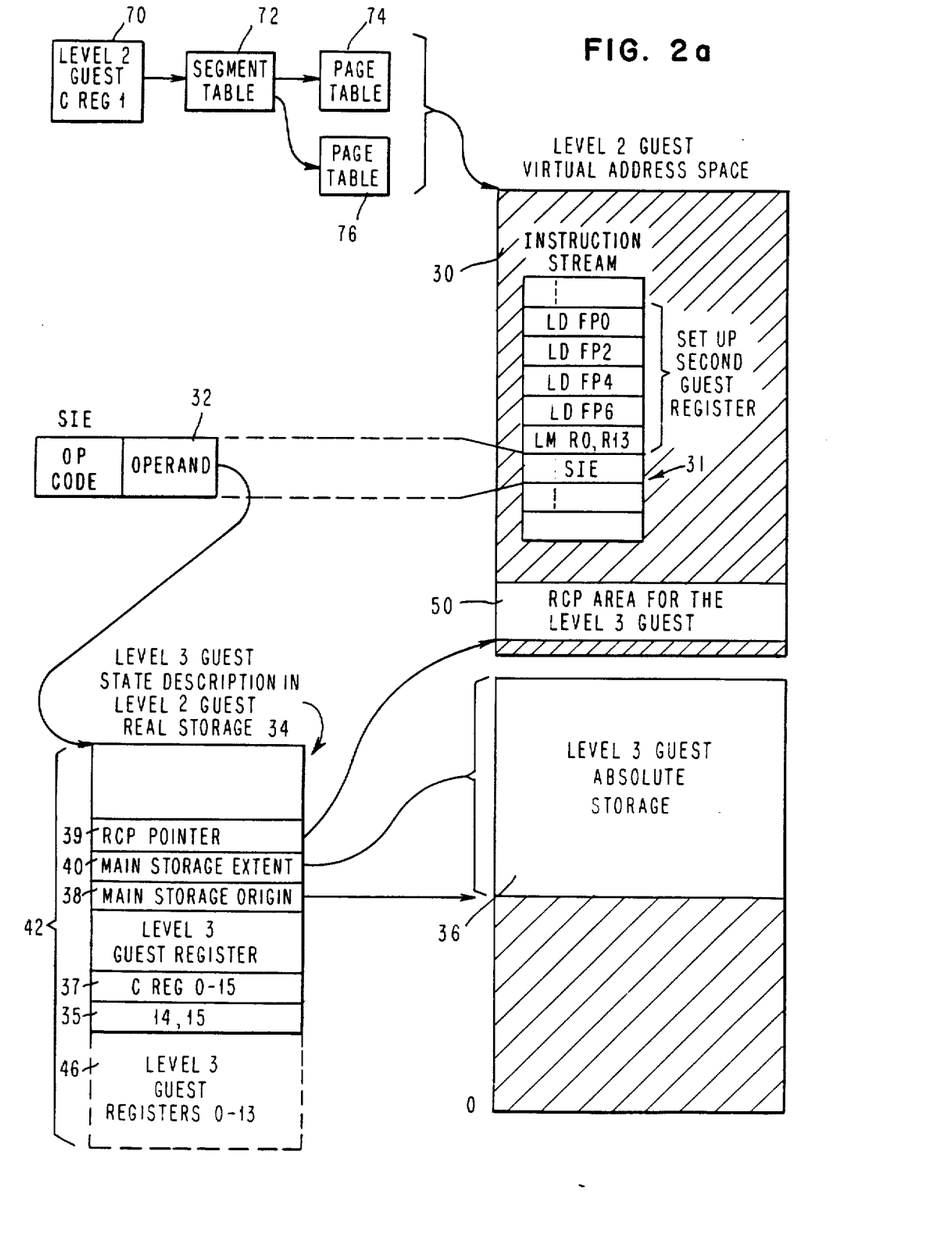
FIG. 2a is a block diagram showing elements of the virtual machine system of FIG. 1.

As indicated above, specific fields in a guest's state description, such as level 3 guest state description 34 in FIG. 2a specify the architecture and storage mode of the guest to be interpreted. An explanation of state description and storage modes is provided in IBM publication SA22-7095-0 cited above.

Storage modes are specified in a field of the state description. Guest main (absolute) storage is represented by host storage in either pageable storage mode or preferred storage mode. In VM/XA, a separate host virtual address space is provided for each pageable guest. Also, in the pageable storage mode, virtual addresses are capable of being translated to real storage addresses by a data address translation (DAT) facility. The DAT facility is also described in the above cited reference and is shown conceptually in FIG. 2a. In particular, FIG. 2a shows level 2 guest control register 70 (C reg 1) pointing to level 2 guest segment table 72 which, in turn, points to several page tables 74 and 76 for the purpose of mapping the level 2 guest virtual address space 30 to the level 2 guest real address space (not shown).

Program-addressable guest registers are also specified in fields in the state description. In level 3 guest state description 34 of FIG. 2a, fields 35 specify the contents of level 3 guest registers 14 and 15. Fields 37 specify the contents of level 3 guest control registers (C reg) 0 through 15.

Figure 2B:
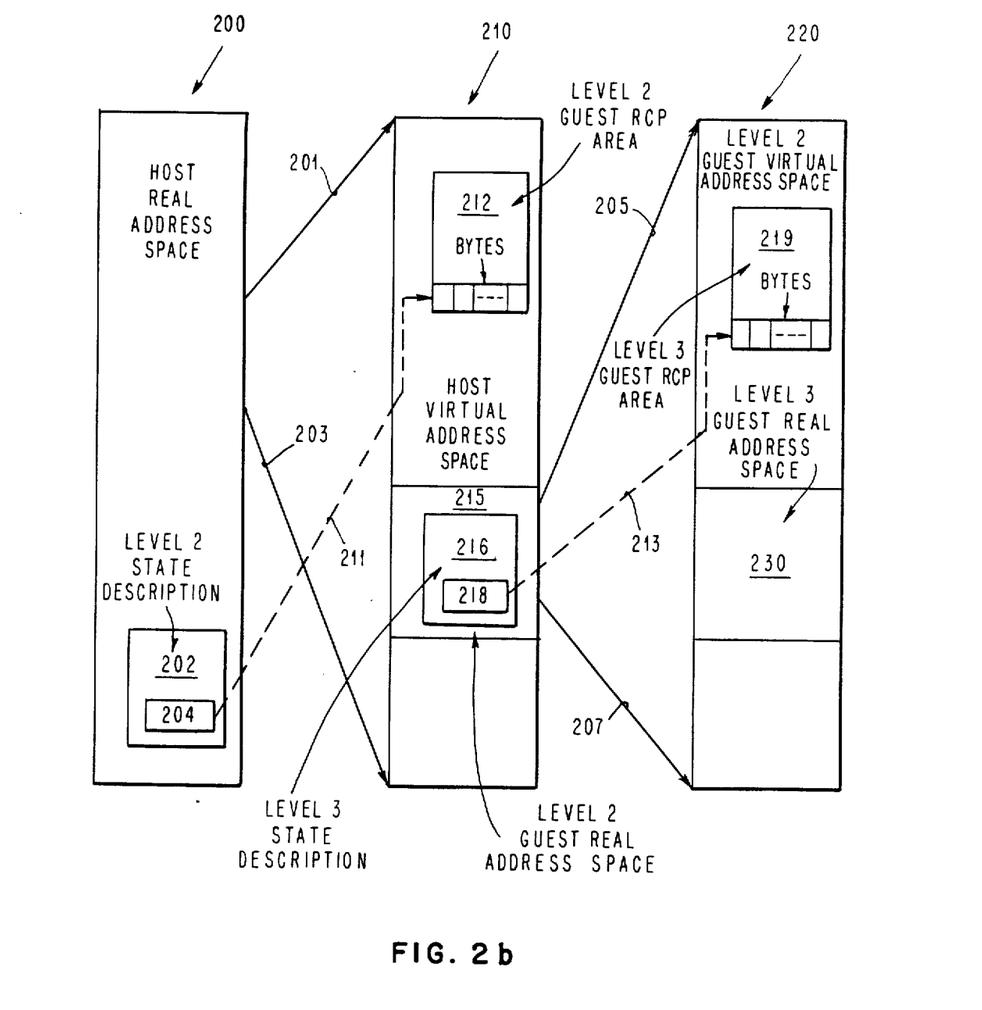
FIG. 2b is a block diagram showing the address spaces, state descriptions and RCP address origins of elements of the virtual machine system of FIG. 1.

Another field in the state description is the page reference and change preservation (RCP) origin which specifies the starting virtual address of an RCP area in a virtual address space used to retain page change and reference (access) information (the correct status of a page) when pageable-storage mode is specified. In particular, FIG. 2b shows host real address space 200, host virtual address space 210 (specified by host control register 1 as conceptually shown by arrows 201 and 203), level 2 guest real storage 215, level 2 guest virtual address space 220 (specified by guest control register 1 as conceptually shown by arrows 205 and 207) and level 3 guest real address space 230. Host real address space 200 includes level 2 guest state description 202 which has RCP address 204 that points (dotted arrow 211) to the origin of level 2 guest RCP area 212 in host virtual address space 210. The area pointed to by address 204 in the RCP field of the state description 202 contains one byte for each page of level 2 guest main absolute storage. Similarly, level 2 guest real address space 215 includes level 3 guest state description 216 which has RCP address 218 that points (dotted arrow 213) to the origin of level 3 guest RCP area 219 in level 2 guest virtual address space 220. The area pointed to by address 218 in the RCP field of state description 216 contains one byte for each page of level 3 guest main absolute storage. Each page also has associated with it a real storage key byte in order to provide the current status of a page. A real storage key byte, e.g. host storage key 300 in FIG. 2c, includes real reference (R) and change (C) bits which are manipulated (dynamically set or reset) by hardware manipulating instructions when storage accesses or changes in storage contents occur. A real storage key also includes access-control field (A) and fetch protection (F) bit. The RCP area and real storage key bytes are more fully described below and in the above-referenced IBM publications.

RCP AREA

When execution of a storage key manipulating operation (generated by the ISK (ISKE), SSK (SSKE) or RRB (RRBE) instructions described below) for the guest is attempted, SIE will cause the interpretive execution hardware to intercept and interpret these instructions if the interlock bit is set.

Generally, the RCP bytes in the RCP area are only updated when an SSK or SSKE (SET STORAGE KEY) or RRB or RRBE (RESET REFERENCE BIT) instruction is executed. For example, the RCP area for a level 2 guest will be updated when the host executes SIE to process instructions for a level 3 guest. In general, when a pageable guest attempts to execute an SSK instruction, SIE will cause interception of the instruction. The following bit changes then occur substantially as indicated:

1. The interlocking bit is set in order for the interpretive execution hardware to have exclusive use of the guest's RCP area.

2. Interpretive execution hardware updates bit settings in an RCP byte in the RCP area, which corresponds to the page being accessed, by performing a logical inclusive "OR" of:
   a. the reference bit in the real storage key byte with the host reference bit in the RCP byte; and
   b. the change bit in the real storage key byte with the host change bit in the RCP byte.

3. The result of each logical inclusive "OR" appears in the corresponding host bit locations in the RCP byte.

4. SSK resets to zero the reference and change bits in the real storage key byte in preparation for a subsequent page access which would then set either the reference or the change bit, as appropriate, in the real storage key byte. The bits in the real storage key are always manipulated (set) by the interpretive execution hardware.

5. Interpretive execution hardware then sets
   a. the guest change bit in the RCP byte; and
   b. the guest reference bit in the RCP byte.

The outcome is that the host status has been retained in the host portion of the RCP byte due to the guest SSK instruction when the real storage key byte is changed by guest storage key manipulating operations. It is understood that guest status can also be retained in like manner in the guest portion of the RCP byte when the real storage key byte is changed by host software (storage key manipulating operations). (Note: If the guest executed the RRB or RRBE instruction, the bit manipulation described above would only apply to the reference bit in the guest's real storage key byte and the host reference bit in the RCP byte. The change bits in the guest's real storage key byte and the RCP byte would not be changed. The RRB instruction provides a read access followed by a write access without an intervening access thus ensuring that accurate reference and change information is maintained.)

The ISK or ISKE (INSERT STORAGE KEY) instruction performs a logical inclusive "OR" of the bits of the guest's real storage key byte with the corresponding bits of the guest portion of the RCP byte. The result becomes the reference and change bit values for the ISK instruction. This instruction, along with the interlocking bit, provides coordination with a host program being executed concurrently on another CPU to ensure that reference and change information will be consistent.

The ISK instruction does not change either the guest's real storage key byte or the RCP byte. All storage key manipulating instructions operate on real addresses. (The same RCP area is designated in more than one state description when a guest main storage multiprocessing system is interpreted.)

METHOD OF OPERATION

FIG. 2a also shows a level two virtual machine (level 2 guest) which can execute a second copy of the same version of the host (VM/XA) system control program or other programs which include the SIE and other privileged instructions. Level three contains a virtual machine (level 3 guest) which can execute guest programs that include SIE and other privileged instructions. In this case, programs running at higher levels, i.e. level three, could also be considered guest programs of the lower level two virtual machine which itself could be considered as a "host". In FIG. 2a, the level 2 guest includes virtual address space 30 in which instructions (instruction stream 31) are being processed up to SIE instruction 32. (It is understood that the instruction stream can be in either real or virtual storage.) The operand of SIE instruction 32 is level 3 guest state description 34 which is stored in the level 2 guest's real storage area. The level 3 guest includes absolute address space 36 which is defined by main-storage origin field 38 and main-storage extent field 40 of level 3 guest state description 34. With regard to FIG. 2a, a method of operation involving interpretive execution and two levels of guests is briefly described as follows:

1. Prior to executing the SIE, a level 2 guest state description is provided by VM/XA in the host for specifying the type of level 2 guest being interpreted. The host executes an SIE instruction which causes the host to enter the interpretive-execution mode and to begin performing the functions of the level 2 guest, i.e. instruction stream 31.

2. Processing continues in instruction stream 31 from one level 2 guest instruction to the next in normal fashion until an interception condition, i.e. SIE instruction 32, occurs. If the intercepted instruction is SIE instruction 32, virtual machine interpretation continues by means of a virtual start interpretation execution (V/SIE) simulation which permits the level 2 guest to execute intercepted SIE instruction 32. The intercepted SIE instruction issued by the level 2 guest indicates that level 3 guest instruction processing is required. V/SIE support in the host machine simulates the interpretive execution mode and the SIE instruction by the real machine. (Level 3 guest state description 34 is provided in the level 2 guest real address space for specifying the type of level 3 guest for which instructions are to be processed. State description 34 is the operand of intercepted SIE instruction 32. V/SIE will also operate in the environment of VM/XA itself running in a guest machine.)

3. To simulate the intercepted SIE issued by the level 2 guest, the host builds a shadow state description 42 (substantially a copy of level 3 guest state description 34 with adjusted parameters) that identifies and describes, i.e. indicates the storage mode of, the level 3 guest for which instruction processing is requested. The level 3 guest is therefore described directly to the real machine, bypassing the level 2 guest. (The shadow state description is created by copying the operand of the intercepted level 3 guest SIE instruction in host storage, copying a portion of the level 2 guest state description, adjusting some of the parameters and adding some parameters such as level 3 guest register fields 46. For example, as shown in FIG. 2a, the current contents of level 3 guest registers 0 through 13 supplement state description 34 upon creation of shadow state description 42. However the contents of these registers are never disturbed during entry to or exit from the interpretive-execution mode. The intercepted SIE 32 is, in effect, reissued by the host program, designating the shadow state description 42 in host storage as if it were a state description for a level 2 guest.)

4. Shadow translation tables for mapping a guest's virtual storage into the host's main (absolute) address space are constructed for the reasons explained below. The shadow state description and the shadow tables are created by the system control program the first time that the level 2 guest attempts to execute SIE.

5. On interception from instruction execution in the level 3 guest, certain parameters, i.e. interception parameters, are copied from the shadow state description in host storage in level 3 guest state description 34 within the level 2 guest real storage. Instruction execution is then resumed in the level 2 guest by issuing SIE using the level 2 state description in the host.

6. A separate control area in the virtual address space of the level 2 guest, referred to as reference and change preservation (RCP) area 50, is provided for retaining the values of page change and reference indicators that are separately applicable to a guest and to the host when pageable storage mode is specified. This area is identified (pointed to) by RCP address field 39 in second guest state description 34 which is copied into shadow state description 42.

It is understood that additional levels of guests could be implemented, but that a practical limit is obtained at some level because CPU power or storage will be exhausted.

V/SIE SUPPORT

Figure 3:
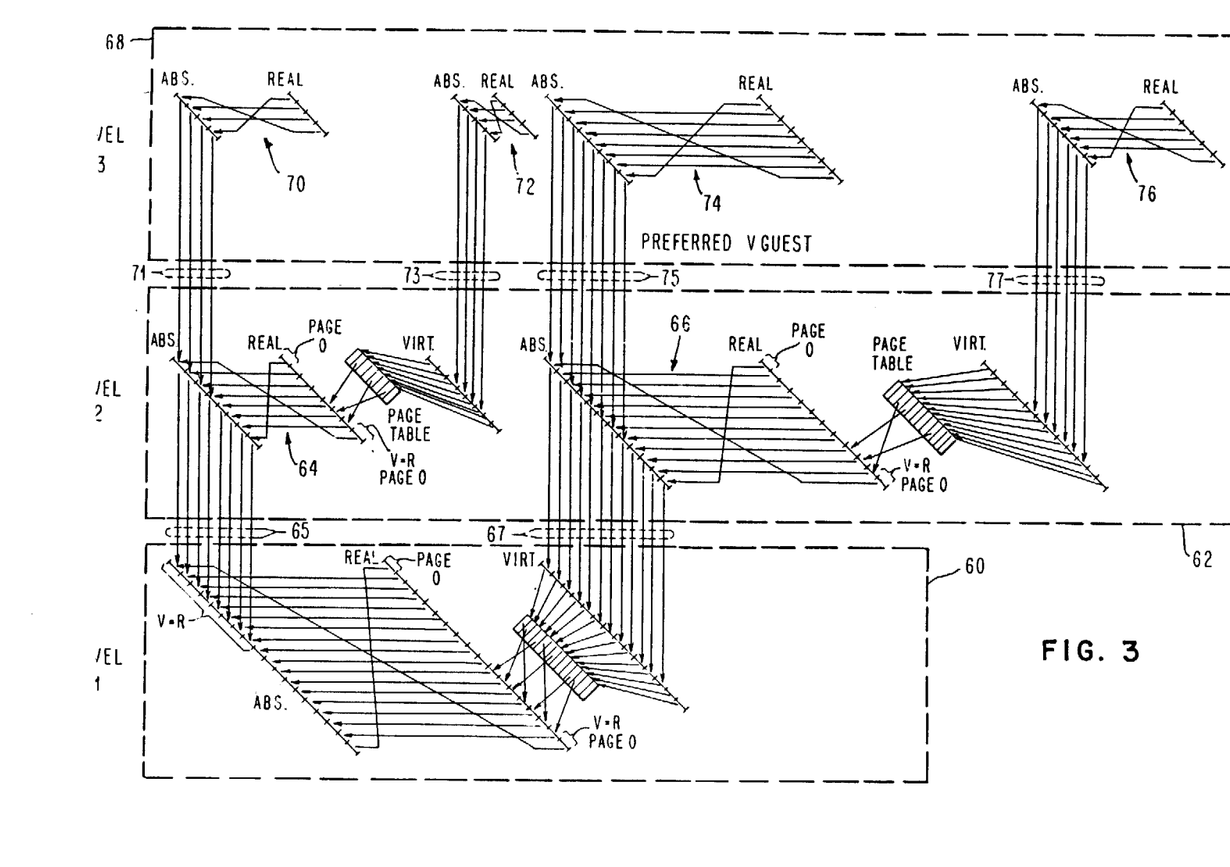
FIG. 3 is a block diagram showing the mapping of address spaces in the virtual machine system of FIG. 1.

FIG. 3 shows conceptually how address spaces (slanted lines) are mapped when V/SIE simulates an SIE instruction that is intercepted after a level 2 guest has attempted to execute it. (The address spaces are divided into 4K pages (tic marks).) The intercepted SIE was intended to process instructions for a level 3 guest by a level 2 guest. The address spaces of the host are shown in block 60. The address spaces of two level 2 guests are shown in block 62. In this embodiment, the two level 2 guests include preferred real-guest 64 and pageable real-guest 66. Mapping of the absolute address space of preferred real-guest 64 to the host absolute address space is shown by lines 65. Mapping of the absolute address space of pageable real-guest 66 to the host virtual address space is shown by lines 67. The address spaces of four level 3 guests are shown in block 68. In this embodiment, the four level 3 guests include preferred virtual-guest 70, pageable virtual-guest 72, preferred virtual-guest 74 and pageable virtual-guest 76. Mapping of the absolute address spaces of each of the four level 3 guests to corresponding locations of the level 2 guest address spaces is shown by lines 71, 73, 75 and 77 in FIG. 3. Through an appropriate mapping of level 2 addresses to level 1 addresses, the V/SIE simulation routines allow the interpretive execution hardware to provide for the mapping of virtual and real addresses for each of the four guests at level 3. (In particular, lines 65, 67, 71, 73, 75 and 77 represent the mapping of pages in one address space to pages in another address space.)

HOST STORAGE MAPPING

As indicated above, block 60 shows portions of the address spaces of the host. The host virtual address space simulates a large guest real storage.

The host's real address space, i.e. the computer system's real storage size, is fixed having substantially any number of physical memory locations directly addressable by the real machine, i.e. 16M locations, 32M locations, etc. The host's real address space is structured into page frames each of which is the same size as a page in the host virtual address space, i.e. having 4K locations. The fixed size page frames are allocated to users by the host which must translate host virtual addresses to host real addresses. This type of address translation is performed by a special real machine facility generally referred to as the dynamic address translation (DAT) facility. This facility is discussed in the above cited references.

Host real page 0 includes the range of host real addresses 0 through 4095. As shown in FIG. 3, host page 0 is assigned (mapped) to a 4K page in host absolute storage. This page in host absolute storage is identified by the contents of the prefix register (prefix value) located in the real machine CPU. Also, the page of real addresses having a starting address identified by the host prefix value is mapped to host absolute addresses 0 through 4095 (V=R page 0). All of the remaining host real addresses are mapped, on a one-to-one basis, with corresponding host absolute addresses. These transformations are called prefixing (host prefixing). Host prefixing is discussed in the above cited references.

LEVEL 2 GUEST STORAGE MAPPING

Block 62 shows portions of the address spaces of two level 2 virtual machines (guests) including preferred real-guest 64 and pageable real-guest 66. The level 2 guests each include a virtual address space, a real address space and an absolute address space. In the case of preferred real-guest 64, the interpretive execution hardware in the host provides for the mapping of the preferred real-guest's absolute address space directly to the host's absolute address space (V=R) with a one-to-one correspondence. In the case of pageable real-guest 66, the interpretive execution hardware in the host provides for the mapping of the pageable real-guest's absolute address space to a continuous portion of the host's virtual address space designated by host control register 1. In the latter case, the mapped absolute address space can be offset from the origin (beginning) of the host's virtual address space in accordance with the main-storage origin field designation. However, for this embodiment, the offset is zero. It shall be understood that similar results can be obtained with a non-zero offset. The host provides a separate host virtual address space for each level 2 pageable guest. It is understood that the host can support a plurality of level 2 pageable guests.

The level 2 guests may utilize the DAT facility for one level of translation substantially in the manner described in the references. In both level 2 guest cases, a guest virtual address is translated to a guest real address, using guest translation tables, i.e. using the guest DAT facility. Prefixing (guest prefixing) is then applied to produce a guest absolute storage address. A guest absolute storage address is treated as the corresponding host absolute storage address (see lines 65) when level 2 preferred storage mode is specified in the level 2 guest state description. If the pageable storage mode were specified, a guest absolute address is treated as a host virtual address (see lines 67). (If an offset were implemented, the pageable guest absolute address would be converted to a host virtual address by adding to it the guest main storage origin, which is the host virtual address at which pageable guest storage begins in the host virtual address space.) The host virtual address would then be translated to a host real address using the DAT facility as indicated above. (The guest translation tables, i.e. page table, establish the correspondence between the guest's segmented virtual address space and the actual locations of segments in the guest's real address space. The address spaces of each guest are divided into 4K segments or pages. Similarly with respect to address translation in the host.)

LEVEL 3 GUEST STORAGE MAPPING

FIG. 3 also shows how the address spaces of the four level 3 guests are mapped first to level 2 guest address spaces and then to host address spaces. As indicated above, there are four storage mapping variations in the simulation of a level 3 guest's SIE instruction due to the option of preferred or pageable storage modes for each level of guest. Each of these storage mapping variations, which involve certain differences in the details of how the shadow state description and shadow tables are managed, are discussed below following a brief consideration of prefix mapping and the reason for implementing shadow translation tables.

PREFIX MAPPING

When V/SIE is implemented by the host to process level 3 guest instructions, only two locations will provide the SIE hardware with prefix values: the real machine prefix register which always contain the host (CPU) prefix value and the shadow state description which always contains the level 3 guest (CPU) prefix value. The host prefix register is always used for the processing of host interruptions and therefore must always contain the host prefix value. In other words, a host interruption will always occur in host page 0 (host prefix page) and a level 3 guest interruption, or other reference, will always occur in level 3 guest page 0. There are no level 2 guest interruptions, or other references, to level 2 guest page 0 so that the prefix value of the level 2 guest is not generally required. The level 2 guest prefix mapping is located in the shadow translation tables from which level 2 guest prefixing is performed.

SHADOW TABLES

Interpretive execution hardware provides full support of translation of addresses within a level 2 guest, including guest virtual to guest real, and guest real to guest absolute address translation. Interpretive execution hardware also provides translation of level 2 guest absolute address to level 1 host absolute addresses, through either the preferred storage option or the pageable storage option. Thus, the interpretive execution hardware provides two levels of address translation (within a guest at level 2 and from a guest at level 2 to the host at level 1).

When a guest at level 3 is run, however, there are three levels of address translation (level 3, level 2 and level 1). Interpretive execution hardware cannot provide three levels of address translation, but rather only two levels as described above. It is necessary, therefore, for V/SIE software routines in the level 1 host VMM to provide for the extra level of address translation. How this is done depends whether the level 2 guest and the level 3 guest are in either preferred or pageable storage mode. There are therefore four different combinations of address translation to be considered as will be discussed below.

LEVELS OF GUEST MACHINES

If two levels of guests are implemented, there are four variations in the simulation of a guest SIE instruction issued by a level 2 guest. These variations or options are due to the preferred/nonpreferred (pageable) storage modes of guests at different levels, i.e. levels 2 and 3. Each of these variations involves certain differences in the details of how the shadow state description and shadow tables are managed which will be explained below.

Variation 1: Level 3 Pageable Guest - Level 2 Pageable Guest

Figure 4:
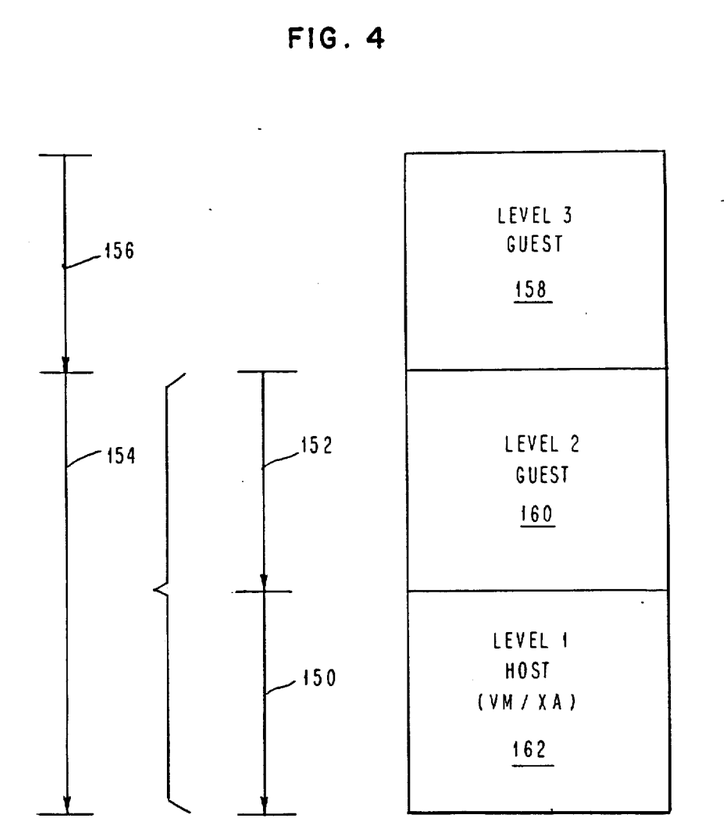
FIG. 4 is a block diagram showing the creation of shadow tables used in the mapping of address spaces in the virtual machine system of FIG. 1.

In the most general case (variation 1), the level 2 guest is pageable and the level 3 guest is also pageable. In this environment, there are three different levels of translation tables, consisting of the level 3 guest translation tables, the level 2 guest translation tables, and the level 1 host translation tables. Since interpretive execution hardware cannot handle more than two levels of address translation, the V/SIE software provides a facility called shadow translation tables for the purpose of reducing the number of levels of address translations required from three to two. The shadow translation tables effectively fold together two levels of address translation as shown conceptually in FIG. 4. In other words, level 1 host translation tables 150 and translation tables 152 for level 2 guest 160 are effectively combined (folded together) into shadow translation tables 154. Interpretive execution hardware can then translate through level 3 guest translation tables 156, followed by translation through the level 1 shadow translation tables 154. The V/SIE software maintains these shadow translation tables to provide address translation (of instructions) from level 3 guest 158 obsolute storage to level 1 host 162 absolute storage in order to process the instructions.

In this variation, V/SIE simulates SIE as though SIE were executed by pageable real-guest 66. A shadow state description is created in the host which describes pageable virtual-guest 76 directly to the host (real machine), thereby bypassing pageable real-guest 66. The pageable virtual-guest prefix value is placed in the shadow state description. The pageable virtual-guest's main storage origin is copied from the pageable virtual-guest's state description in the pageable real-guest to the shadow state description so that mapping will occur, using interpretive execution hardware and shadow tables, from the pageable virtual-guest absolute address space to some continuous portion of the virtual address space provided by the pageable real-guest substantially in the manner described in the references cited above regarding pageable storage mode. The host control register 1 identifies (points to) the shadow tables when the host executes SIE to perform the functions of the pageable virtual-guest since the shadow tables map directly from the pageable real-guest's virtual address space to the host real address space using the DAT facility. The virtual address space of the pageable real-guest maps to the pageable real-guest's real address space through guest segment and page translation tables. The guest segment and page tables are pointed to by the pageable real-guest's control register 1, located in a field of the pageable real-guest's state description, at the time that the pageable real-guest attempts to execute SIE. Mapping continues from the pageable real-guest's real address space to the pageable real-guest's absolute address space through the prefix value located in a field in the pageable real-guest's state description (guest prefixing). The pageable real-guest's prefix value is included in the shadow tables. The pageable real-guest's absolute address space maps to a continuous portion of the host's virtual address space. The host virtual address space, in turn, maps to the host real address space through host segment and page translation tables. The host's translation tables are identified pointed to by the host's control register 1, located in a field of the host's state description, at the time that the pageable real-guest attempts to execute the SIE instruction. The host's real address space maps to the host absolute address space through the prefix value in the host's prefix register (host prefixing). The host prefix value is located in a field of the host's state description.

For this mapping variation, two levels of RCP bytes (areas) are involved and storage key manipulating instructions are intercepted and interpreted by V/SIE. In one level, the entries in the (first) RCP area correspond to pageable real-guest absolute addresses as well as to host virtual addresss meaning that this RCP area is located in the host's virtual address space. See level 2 guest RCP area 212 in FIG. 2b. In the other level, the entries in the (second) RCP area correspond to pageable real-guest 66 virtual addresses and to pageable virtual-guest 76 absolute addresses. This second RCP area is therefore located in the pageable real-guest's virtual address space. See level 3 guest RCP area 219 in FIG. 2b. The RCP areas in both levels will be maintained and updated by V/SIE software.

Figure 2C:
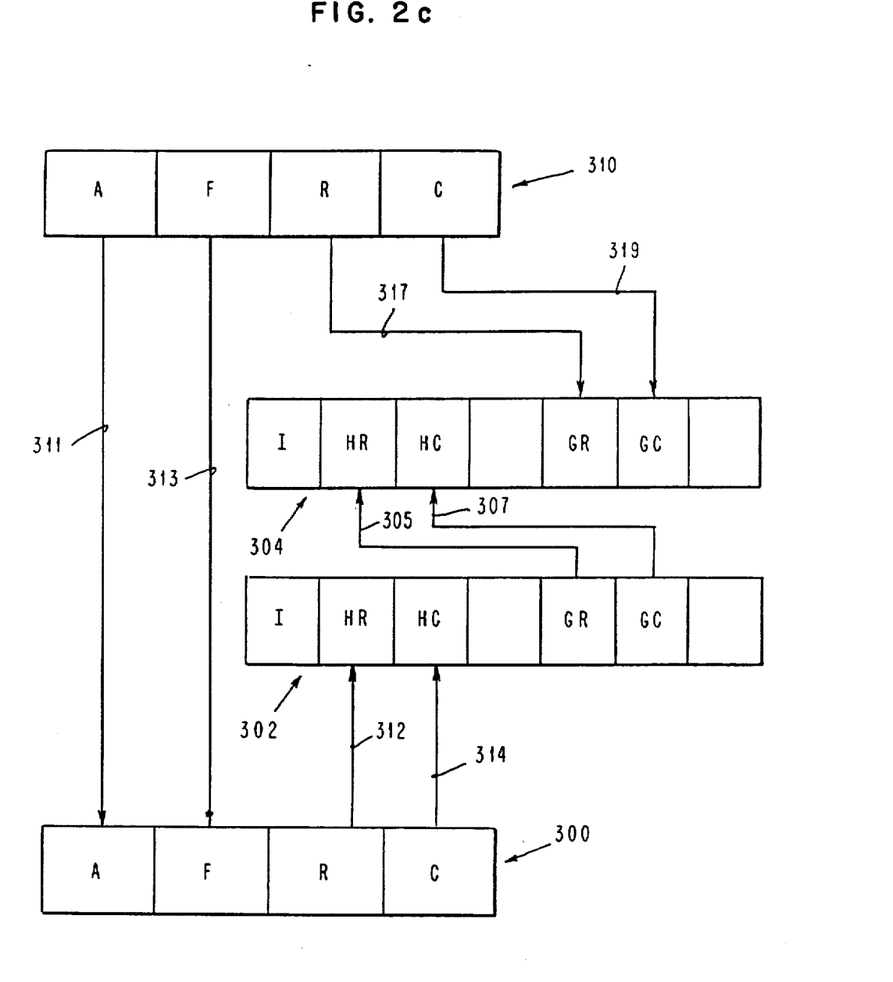
FIG. 2c is a block diagram showing storage key and RCP bit manipulation for a real machine and two levels of virtual machines.

FIG. 2c shows SSK key 310, host storage key 300, RCP byte 302 (representing the pageable real-guest key) and RCP byte 304 (representing the virtual-guest key). With respect to FIG. 2c, V/SIE software provides for RCP bit manipulations for a host machine and two levels of guest by:

1. setting the interlocking (I) bit in each RCP byte in order for the V/SIE software to have exclusive use of the RCP areas;

2. performing a logical inclusive "OR" (arrow 312) of the reference (R) bit in host storage key 300 with the host reference (HR) bit in RCP byte 302 (with the result appearing in the HR bit of RCP byte 302);

3. performing a logical inclusive "OR" (arrow 314) of the change (C) bit in host storage key 300 with the host change (HC) bit in RCP byte 302 (with the result appearing in the HC bit of RCP byte 302);

4. resetting to zero the reference (R) and change (C) bits and setting the access-control (A) field (arrow 311) and fetch protection (F) bit (arrow 313) in host storage key 300;

5. performing a logical inclusive "OR" (arrow 305) of the level 2 guest reference (GR) bit in RCP byte 302 with the host reference (HR) bit in RCP byte 304 (with the result appearing in the HR bit of RCP byte 304);

6. performing a logical inclusive "OR" (arrow 307) of the level 2 guest change (GC) bit in RCP byte 302 with the host change (HC) bit in RCP byte 304 (with the result appearing in the HC bit of RCP byte 304); and 7. resetting to zero the reference (GR) and change (GC) bits of RCP byte 302 and setting the reference (GR) bit (arrow 317) and the change (GC) bit (arrow 319) in RCP byte 304.

As a result, the host status is retained in the host portion of RCP byte 302 and the level 2 guest status is retained in the host portion of RCP byte 304 while bits R and C of host storage key 300 and bits GR and GC of RCP byte 302 are set to indicate the occurrence of a subsequent page access.

Variation 2: Level 3 Preferred Guest - Level 2 Preferred Guest

In this variation, V/SIE simulates SIE as though SIE were executed by preferred real-guest 64. In this variation, preferred real-guest 64 serves as a virtual host to preferred virtual-guest 70. The absolute address space of preferred virtual guest 70 maps directly to the lower portion of the absolute address space of preferred real-guest 64, which in turn maps directly to the lower portion of the absolute address space of the host. In other words, virtual-guest absolute addresses are effectively treated unmodified as host absolute addresses. In this case, V/SIE support does not require shadow translation tables since a direct mapping (one-to-one) of level 3 guest absolute to level 1 host absolute is used. However, a shadow state description is created in the host which describes preferred virtual-guest 70 directly to the host, thereby bypassing the level 2 guest. SIE uses this shadow state description to process the instructions of the preferred virtual-guest. The level 3 guest prefix value is placed in the shadow state description so that during SIE execution, interruptions of the preferred level 3 guest, and other references to the preferred level 3 guest nucleus page 0, will reference preferred level 3 guest real page 0 which is within the storage area of the host devoted to the preferred level 2 guest. The host, realizing that level 3 preferred storage mode is specified, executes the SIE instruction so that preferred virtual-guest 70 absolute addresses translate directly to level 1 host absolute addresses with a one-to-one correspondence. SIE provides the address translation from the level 3 guest to the host substantially in the manner described in the references cited above regarding preferred storage mode. In this way, SIE is used in the host simulation of SIE, and the processing of preferred level 3 guest instructions by the host proceeds at a rapid pace.

For this mapping variation, no RCP bytes are involved and storage key manipulating instructions are not intercepted. The real storage key bytes of the host absolute storage are manipulated when preferred real-guest 74 attempts to execute a key manipulating instruction affecting the host's real storage key bytes and the real storage key bytes of preferred real-guest 64 and manipulated when preferred virtual-guest 70, under V/SIE, attempts to execute a key manipulating instruction affecting the preferred real-guest's real storage key bytes. Each storage key byte has only one owner.

Variation 3: Level 3 Pageable Guest-Level 2 preferred Guest

In this variation, V/SIE simulates SIE as though SIE were executed by preferred real-guest 64. In effect, when the host executes SIE to perform pageable virtual-guest 72 processing, V/SIE support provides a host shadow state description, host shadow translation tables and prefixing to map the preferred real-guest's virtual address space directly to the host's absolute address space. A shadow state description is created in the host which describes the pageable virtual-guest 72 directly to the host (real machine), thereby bypassing preferred real-guest 64. The host's shadow translation tables are copies of the real-guest's translation tables and are used for level 2 guest address translation. The pageable virtual-guest's main storage origin is copied from the pageable virtual-guest's state description (in the real-guest) to the shadow state description in the host so that SIE will provide the mapping, using interpretive execution hardware and shadow tables, from pageable virtual-guest 72 absolute address space to some continuous portion of the virtual address space provided by preferred real-guest 64 substantially in the manner described in the references cited above regarding pageable storage mode. The host control register 1 then points to the host shadow translation tables which maps the real-guest's virtual address space directly to the host's absolute address space using the DAT facility substantially in the manner described in the references. The real-guest translation tables are identified (pointed to) by the preferred real-guest's control register 1, located in a field of the preferred real-guest's state description, at the time that the preferred real-guest attempts to execute the SIE instruction. Mapping continues from the preferred real-guest's real address space to the preferred real-guest's absolute address space through the prefix value located in the preferred real-guest's state description (guest prefixing). Finally, the preferred real-guest's absolute address space maps directly to the lower portion of the host absolute address space. (It could be possible to avoid using shadow tables in this case by using the level 2 guest translation tables instead of shadow tables. However, the host could not ensure the validity of the tables provided by the level 2 guest thereby breaching the integrity of the host. Even if the host could validate the tables, the level 2 guest could alter the tables after validation by the host.)

For this mapping variation, storage key manipulating instructions are intercepted and interpreted by the interpretive execution hardware. The RCP bytes are provided by the preferred real-guest's virtual address space and will be updated by V/SIE software.

Variation 4: Level 3 Preferred Guest - Level 2 Pageable Guest

In this variation, V/SIE simulates SIE as though SIE were executed by the pageable first guest. A shadow state description is created in the host which describes preferred virtual-guest 74 as pageable since the host recognizes real-guest 66 as pageable storage mode. The preferred virtual-guest prefix value is placed in the shadow state description. The absolute address space of preferred virtual-guest 74 maps directly to (corresponds on a one-to-one basis with) the lower portion of the absolute address space of the pageable real-guest 66 substantially in the manner described in the cited references regarding preferred storage mode. SIE provides for this mapping. Since the level 2 guest is pageable, the pageable real-guest absolute address space maps to the virtual address space provided by the host substantially in the manner described in the cited references regarding pageable storage mode. The host virtual address space, in turn, maps to a host real address space through host segment and page tables using the DAT facility substantially in the manner described in the cited references. Shadow translation tables are not implemented since host segment and page tables for the level 2 guest can be used, as is, for the level 3 preferred guest. Also, level 2 guest prefixing is not performed since level 3 guest absolute addresses map directly to level 2 guest absolute addresses. The host segment and page translation tables are identified (pointed to) by the host's control register 1, located in a field of the host's state description, at the time that the preferred real-guest attempts to execute the SIE instruction. Mapping continues from the host's real address space to the host's absolute address space through the prefix value in the host's prefix register (host prefixing). The host prefix value is located in a field of the host's state description and the prefix register.

A separate host virtual address space is provided for each pageable real-guest. Each separate virtual address space contains only the pageable real-guest's absolute storage and the RCP area.

For this mapping variation, storage key manipulating instructions are interpreted by SIE. The RCP bytes are provided by the host virtual address space and will be maintained and updated by interpretive execution hardware substantially in the manner described in the references. The host RCP table is in the host virtual address space which also contains a representation of level 2 guest storage.

Figure 5:
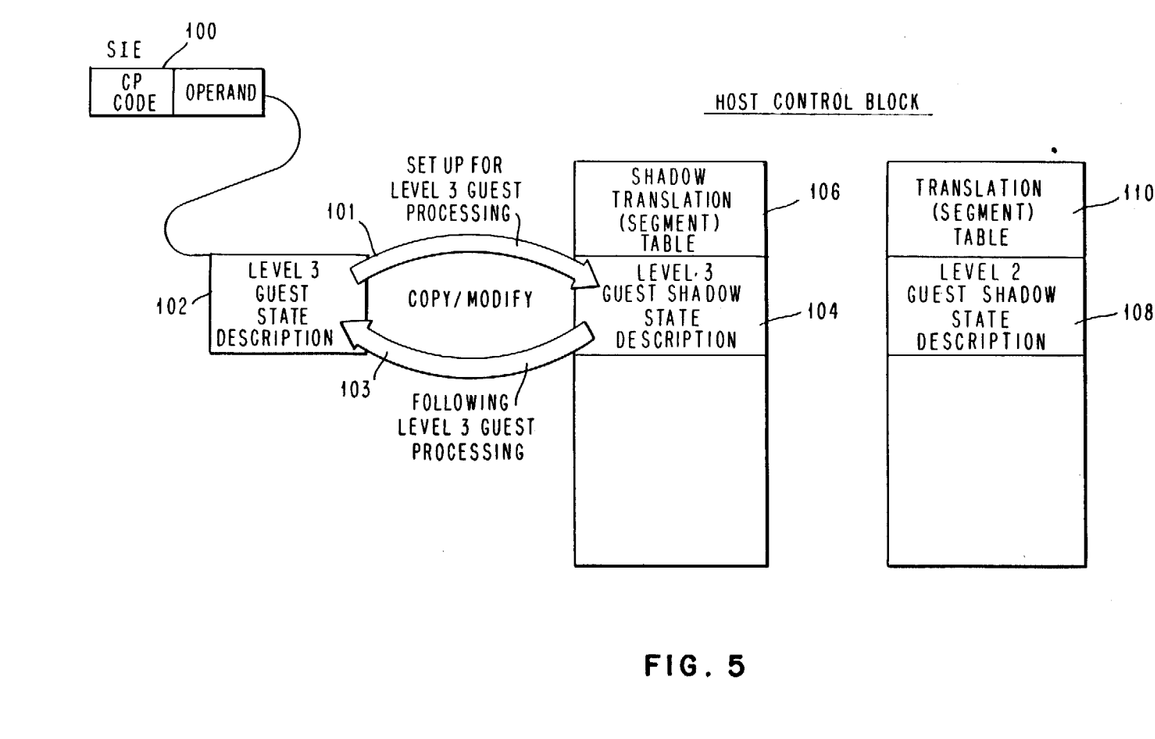
FIG. 5 is a block diagram showing the impementation of shadow state description and shadow tables used for processing the instructions in a pageable higher level virtual machine.

FIG. 5 summarizes the implementation of state descriptions and segment tables in pageable-storage mode. Execution of instructions in the level 2 guest occurs until SIE instruction 100 is encountered. The operand of SIE instruction 100 is level 3 guest state description 102 which is stored in the level 2 guest's real storage area. The SIE instruction is issued by the level 2 guest indicating that level 3 guest instruction processing is required. V/SIE simulates the level 2 guest intercepted SIE instruction 100 by first creating (arrow 101) level 3 guest shadow state description 104 and shadow translation (segment) table 106, in the host, substantially in the manner described above. The shadow state description describes the level 3 guest machine execution status when the level 2 guest is within SIE execution. The host also includes state description 108 and translation (segment) table 110 which describes machine execution status of the level 2 guest. SIE uses the shadow state description and shadow tables to process the instructions of the level 3 pageable guest. When instruction processing ends, changes to the shadow state description are reflected (arrow 103) in level 3 guest state description 102. Instruction processing is now continued in the level 2 guest following the SIE instruction.

While the invention has been particularly shown and described with references to preferred embodiments thereof, it will be understood by those skilled in the art that the foregoing and other changes in form and details may be made therein without departing from the spirit and scope of the invention.

What is claimed is:

1. In a computer system having a real machine, multiple levels of virtual machines in different storage modes in which said real machine and a low level virtual machine use the same architecture, storage including pages having storage keys, reference and change preservation bytes, tables describing said virtual machines and a privileged instruction, having an operand, which initiates hardware that is capable of mapping only non iteratively between two levels of virtual and real machines, and that provides for said real machine to enter a predetermined virtual machine processing mode, the method of processing instructions in higher level virtual machines by said real machine, comprising the steps of:

intercepting said privileged instruction in one of said low level virtual machines indicating that instruction processing is required in a higher level virtual machine having the same or different architecture than said real machine, creating from said tables describing said low level and said higher level virtual machines a non-nested, software-combined composite table in said real machine, following said privileged instruction, that identifies and describes said higher level virtual machine, and reissuing said privileged instruction, in which said operand of said privileged instruction is said composite table for identifying and describing said higher level virtual machine, in which the description is free of any fault condition, directly to said real machine so that processing may continue within said higher level machine using said composite table.

2. The computer system of claim 1 in which the settings of bits in a storage key provide the current status of a page associated with said storage key.

3. The computer system of claim 2 in which a reference and change preservation byte is updated corresponding to said bits in said storage key for retaining higher level virtual machine and real machine status when said instructions are processed in said higher level virtual machine.

4. The computer system of claim 1 in which said privileged instruction is a start interpretive execution instruction.

5. The computer system of claim 4 in which said composite table is created to provide for the simulation of said start interpretive execution instruction by virtual start interpretation execution simulation in said real machine.

6. The computer system of claim 5 in which said virtual start interpretation execution simulation simulates said start interpretive execution instruction for the purpose of processing said instructions in said higher level virtual machine in interpretive execution mode.

* * * * *